Patented Dec. 13, 1938

2,139,730

UNITED STATES PATENT OFFICE 2,139,730

FILLER MATERIAL FOR WELDING

Joseph Ralph Dawson, Niagara Falls, N. Y., assignor to Oxweld Acetylene Company, a corporation of West Virginia No Drawing. Application May 4, 1938,
Serial No. 205,979

3 Claims. (Cl. 75—160)

This invention relates to filler material for welding and brazing and has for its principal object an improved copper-base filler material.

Patent 2,015,859, issued October 1, 1935 to Arthur R. Lytle, describes a filler material for welding and brazing consisting principally of copper, phosphorus, and silicon, the phosphorus content being between 0.05% and 0.3%, the silicon content being between 0.2% and 0.6%, and the remainder copper, except for minor constituents in amounts insufficient to change the characteristics of the filler material. This material is free-flowing when molten and results in a sound weld when deposited by welding or brazing. Welds made with this material, however, tend to crack, particularly when such welds are of relatively great length or thickness. It is an object of the present invention so to improve the filler material described above as to overcome the tendency to crack.

According to the present invention, manganese in an amount not exceeding 0.3% is added to filler material for welding and brazing comprising 0.05% to 0.6% silicon, 0.05% to 0.3% phosphorus, and the remainder copper. Such addition of manganese effectively overcomes the tendency of the filler material to crack, even in relatively long and thick weld deposits. More than about 0.3% manganese produces a tendency to crack. A preferred content of manganese is between 0.02% and 0.07%, and a preferred silicon content is 0.2% to 0.5%. The filler material may conveniently be used in the form of a welding rod.

I claim:

1. Filler material for welding and brazing comprising 0.05% to 0.6% silicon; 0.05% to 0.3% phosphorus; manganese in an amount not exceeding 0.3%; and the remainder copper.

2. Filler material for welding and brazing comprising 0.05% to 0.6% silicon; 0.05% to 0.3% phosphorus; 0.02% to 0.3% manganese; and the remainder copper.

3. A welding rod comprising 0.2% to 0.5% silicon; 0.05% to 0.3% phosphorus; 0.02% to 0.07% manganese; and the remainder copper.

JOSEPH R. DAWSON.